(12) United States Patent
Patel et al.

(10) Patent No.: US 7,485,683 B2
(45) Date of Patent: Feb. 3, 2009

(54) COMPATIBILIZERS FOR FLUOROPOLYMERS AND POLYOLEFINS; BLENDS THEREOF

(75) Inventors: Raman Patel, Cumberland, RI (US); Biing-Lin Lee, Cranston, RI (US); John C. Andries, E. Greenwich, RI (US); Maryellen Cox, Cranston, RI (US)

(73) Assignee: Teknor Apex Company, Pawtucket, RI (US)

(*) Notice: Subject to any disclaimer, the term of this patent is extended or adjusted under 35 U.S.C. 154(b) by 100 days.

(21) Appl. No.: 11/474,803

(22) Filed: Jun. 26, 2006

(65) Prior Publication Data
US 2006/0247379 A1 Nov. 2, 2006

Related U.S. Application Data

(62) Division of application No. 10/793,160, filed on Mar. 4, 2004, now Pat. No. 7,094,836.

(51) Int. Cl.
*C08F 8/00* (2006.01)
*C08F 214/26* (2006.01)
*C08L 9/00* (2006.01)
*C08L 27/12* (2006.01)
*C08L 33/02* (2006.01)
*C08L 33/04* (2006.01)
*C08L 33/06* (2006.01)
*C08L 35/02* (2006.01)
*C08J 3/00* (2006.01)

(52) U.S. Cl. ........... 525/192; 525/193; 525/195; 525/196; 525/199; 525/200; 525/221; 525/222; 525/227; 525/232

(58) Field of Classification Search ............ 525/192, 525/193, 195, 196, 199, 200, 221, 222, 227, 525/232
See application file for complete search history.

(56) References Cited

U.S. PATENT DOCUMENTS

| | | | |
|---|---|---|---|
| 4,415,694 A | 11/1983 | Roiko et al. | |
| 4,528,329 A | 7/1985 | Inoue et al. | |
| 4,737,547 A | 4/1988 | White | |
| 4,886,689 A * | 12/1989 | Kotliar et al. | 428/35.7 |
| 4,931,499 A | 6/1990 | Sakai et al. | |
| 5,576,106 A | 11/1996 | Kerbow et al. | |
| 5,593,730 A | 1/1997 | Satgurunathan et al. | |
| 5,614,319 A | 3/1997 | Wessels et al. | |
| 5,741,855 A * | 4/1998 | Kaduk et al. | 525/88 |
| 6,140,408 A | 10/2000 | McCarthy et al. | |
| 6,277,914 B1 | 8/2001 | Oreins et al. | |
| 6,303,686 B1 | 10/2001 | Kitahara et al. | |
| 6,414,081 B1 | 7/2002 | Ouhadi | |
| 6,476,117 B1 * | 11/2002 | Wang et al. | 524/504 |
| 6,476,125 B1 | 11/2002 | Iura et al. | |
| 6,797,781 B2 | 9/2004 | Lee et al. | |
| 2003/0162903 A1 | 8/2003 | Day | |
| 2003/0204021 A1 | 10/2003 | Lee et al. | |

FOREIGN PATENT DOCUMENTS

| | | |
|---|---|---|
| EP | 0 761 757 | 3/1997 |
| JP | 58198529 | 11/1983 |
| JP | 61163952 | 7/1986 |
| JP | 62027448 | 2/1987 |
| JP | 62041202 | 2/1987 |

* cited by examiner

*Primary Examiner*—Nathan M Nutter
(74) *Attorney, Agent, or Firm*—Hudak, Shunk & Farine Co. LPA

(57) ABSTRACT

A compatibilizer including a first portion compatible with a fluoropolymer and a second portion compatible with a polyolefin. Compatibilized compositions comprising a polyolefin, a fluoropolymer, and a compatibilizer are also disclosed. Methods for forming both the compatibilizer and the blends contained in the compatibilizer are described. The compatibilized compositions of the present invention exhibit desired mechanical properties such as tensile strength and elongation. The flame retarded compatibilized blends exhibit desirable dielectric properties, are flame resistant and exhibit low smoke emission.

27 Claims, No Drawings

COMPATIBILIZERS FOR FLUOROPOLYMERS AND POLYOLEFINS; BLENDS THEREOF

CROSS REFERENCE

This application is a division of U.S. application Ser. No. 10/793,160, filed on Mar. 4, 2004 now U.S. Pat. No. 7,094,836 of Raman Patel et al. for COMPATIBILIZERS FOR FLUOROPOLYMERS AND POLYOLEFINS; BLENDS THEREOF.

FIELD OF THE INVENTION

The present invention relates to a compatibilizer and a method for preparing the compatibilizer. In one embodiment, the compatibilizer is an oligomer or a block or graft copolymer having a first portion compatible with a polyolefin and a second portion compatible with a fluoropolymer. Blends of the compatibilizer with fluoropolymers and polyolefins are also described. The flame retarded compatibilized blends exhibit desirable flame retardance, low smoke emission, and tensile properties, as well as beneficial dielectric properties.

BACKGROUND OF THE INVENTION

In general, fluoropolymers are known to be flame retardant and have low smoke emission qualities. On the other hand, polyolefin materials are often used as insulators as they have relatively good electrical properties and are economical, but generally have poor flame retardant and smoke emission properties when compared to the fluoropolymers. Both fluoropolymers and polyolefins have been utilized as insulating materials for various wire and cable applications.

U.S. Pat. No. 5,576,106 relates to compounds containing polar functional entities which can be grafted onto the surface of fluoropolymer powders to obtain grafted fluoropolymer powders having modified surface characteristics. The grafted fluoropolymer powder is used as an adhesive to join dissimilar materials.

U.S. Pat. No. 6,414,081 relates to blends comprising a non-polar thermoplastic elastomer, a polar thermoplastic polymer selected from thermoplastic polyurethane (TPU), chloro-containing polymers, fluoro-containing polymers, polyesters, acrylonitrile-butadiene-styrene copolymers, styrene-acrylonitrile copolymers, styrene-maleic anhydride copolymer, polyacetal, polycarbonate, polyphenylene oxide, and a suitable compatibilizer.

U.S. Pat. No. 6,476,125 relates to a fluorine-containing polymer alloy comprising a grafted fluorine-containing polymer (a) and a polymer (c) containing no fluorine atom, said grafted fluorine-containing polymer (a) comprising a fluorine-containing polymer (d) having hydrogen atoms bonded to carbon atoms of its main chain and a grafting compound having a linking group capable of grafting to the fluorine-containing polymer (d) and a functional group capable of providing an adhesive property, grafted to the fluorine-containing polymer (d).

The industry needs insulating materials for insulation and jacketing of cables, wire or other applications which are economical and have desirable mechanical properties such as tensile strength and elongation, desirable electrical properties, as well as flame retardance and low smoke emission. Several barriers inhibit the blending of polyolefin with fluoropolymers by conventional means. The polymers themselves are incompatible. Differences in processing temperatures have also been barriers.

SUMMARY OF THE INVENTION

The present invention provides a compatibilizer useful for compatibilizing blends of fluoro(co)polymers and polyolefins. The compatibilizer is an oligomer or a block or graft copolymer which comprises at least one portion or segment which is compatible with a fluoro(co)polymer and at least one portion or segment which is compatible with a polyolefin. Accordingly, the compatibilizer has affinity for both the fluoro(co)polymer and polyolefin, and the presence thereof in a blend improves the compatibility between the fluoro(co)polymer and polyolefin.

The compatibilizer can have a number of different structures. In one embodiment, the compatibilizer is the reaction product of a functional group containing fluoro(co)polymer and a functional group containing olefin component. In a further embodiment, the compatibilizer is the reaction product of a functional group containing fluoro(co)polymer, a functional group containing polyolefin component, and a bridging compound, wherein the functional groups of the fluoro(co)polymer and olefin component are the same or are otherwise non-reactive with each other, with the bridging compound having functional groups reactive therewith. The functional group containing fluoro(co)polymer is the reaction product of a fluoro(co)polymer having at least one labile hydrogen bonded to the main chain, and a linking compound such as an anhydride monomer. In a preferred embodiment, the linking compound has dual functionality capable of reacting with the fluoro(co)polymer and the functionalized olefin component. Various other reaction schemes also exist. Methods for making the compatibilizer are also described.

In a preferred embodiment, the compatibilizer is formed utilizing a melt reaction process, and more preferably a two-step melt reaction process wherein the linking compound is first pendantly grafted to the backbone of a fluoro(co)polymer. The second step involves melt reacting a functionalized polyolefin component with the linking compound-grafted fluoropolymer, i.e., functional group containing fluoro(co) polymer, to form a fluoro(co)polymer having olefins grafted thereto. The compatibilizer is thus formed through reaction of the complementary functional groups present on the linking compound-grafted fluoro(co)polymer and the functionalized polyolefin. It is believed that the compatibilizer has a comb or block structure.

Compatibilized blends comprising the compatibilizer, fluoro(co)polymer and polyolefin are generally formed by melt mixing, such as in an internal mixer, such as a Banbury, single screw extruder, or twin screw extruder, etc. The resulting blends are thermoplastic and are reprocessable on any typical polymer processing equipment into useful articles such as, but not limited to, wire and cable insulation, jacketing, conduits, etc. Flame retardants are utilized in the blends of the invention in some embodiments.

The compatibilized blends of the invention exhibit mechanical properties such as tensile strength and elongation which are desirable. Moreover, the blends have desirable dielectric properties. The blends can be flame retarded to exhibit low smoke emission or formation.

DETAILED DESCRIPTION OF THE INVENTION

In one embodiment of the present invention, a compatibilizer is formed which has at least one segment which is derived from a fluoro(co)polymer, and a second segment which is derived from a polyolefin component. The compatibilizer is useful for compatibilizing blends of fluoro(co)polymers and polyolefins. Further, compositions of the present invention comprise physical blends of the compatibilizer, one or more polyolefins and one or more fluoro(co)polymers. The compositions are preferably melt blended and processed a)

into intermediate pellets, chips, or flakes, etc., which are thermoplastic and can be further processed or b) directly made into useful articles such as wire or cable jacketing, release materials or coatings, and conduits.

Compatibilizer

The compatibilizer or compatibilizing agent of the present invention is an oligomer or copolymer preferably derived from components including a) a fluorine containing component such as a polymer or copolymer, herein referred to as a fluoro(co)polymer, containing at least one functional group per chain and, b) an olefin component derived from a monomer or preferably a polymer, containing at least one functional group per chain and optionally c) a bridging compound which is utilized when a) and b) functional groups are the same or are non-reactive with each other. Thus, the bridging compound is not utilized when the fluoro(co)polymer and olefin component contain complementary reactive functional groups capable of reacting with each other. Preferably, the compatibilizer is a graft or block copolymer, wherein the functional group containing fluoro(co)polymer is derived from the reaction of a linking compound which is grafted to the backbone of the fluorine containing component, and the olefin polymer is grafted or otherwise connected to the functional group containing fluoro(co)polymer. By using such an olefin grafted fluorine-containing copolymer as a compatibilizing agent, it is possible to improve the compatibility of a blend comprising a fluoropolymer and a polyolefin.

A) Functional Group Containing Fluoro(co)polymer

The fluoro(co)polymer utilized to form the compatibilizer contains at least one fluorine atom and at least one labile hydrogen atom bonded to a main chain carbon atom. The labile hydrogen atoms bonded to the main chain are relatively unstable as compared to the fluorine atoms and can be withdrawn from the main chain carbon atoms, such as by reaction with radicals or the like. Linking compounds reacted with a fluoro(co)polymer bond to each carbon atom from which a labile hydrogen atom has been withdrawn, whereby grafting takes place and forms a fluoro(co)polymer having at least one functional group, i.e., a functionalized fluoro(co)polymer.

Examples of suitable fluorine containing polymers having labile main chain hydrogen atoms are derived from compounds including, but not limited to, vinylidene fluoride, vinyl fluoride, (perfluorobutyl)ethylene, (fluoroalkyl)vinyl ether, and the like. Fluorine containing copolymers having a labile main chain hydrogen atom are also derived by copolymerizing fluorine monomers having no main chain hydrogen atom, such as tetrafluoroethylene or a perfluoro(alkyl vinyl ether) and monomers such as ethylene or propylene; or partially fluorinated olefins or other fluorinated vinyl monomers having such a main chain hydrogen atom. Examples of suitable polymers and copolymers include, but are not limited to, ethylene-tetrafluoroethylene copolymer, ethylene chlorotrifluoroethylene copolymer, propylene-tetrafluoroethylene copolymer, polyvinyl fluoride, polyvinylidene fluoride; a terpolymer of tetrafluoroethylene or propylene, hexafluoropropylene and vinylidene fluoride; and a terpolymer of tetrafluoroethylene, ethylene and hexafluoropropylene. Polyvinyl fluoride; polyvinylidene fluoride; ethylene chlorotrifluoroethylene copolymer; a terpolymer of tetrafluoroethylene or propylene, hexafluoropropylene and vinylidene fluoride; and a terpolymer of tetrafluoroethylene, ethylene and hexafluoropropylene are preferred fluoro(co)polymers.

In a preferred embodiment, when a fluoro(co)copolymer is formed utilizing monomers containing no fluorine atoms as well as monomers containing fluorine atoms, the proportions of the polymerized units of the fluorine-containing monomer in the copolymer is generally at least 50 mol %, and preferably at least 70 mol % based on the total polymerized units in order to maintain compatibility with the fluoropolymer in the compatibilized blend.

B) Linking and Bridging Compounds

One or more linking compounds are utilized to impart functional groups to the fluoro(co)polymer or polyolefin, or a combination thereof. The functionalized fluoro(co)polymer and functionalized polyolefin are then reacted to form the compatibilizer of the present invention. In a further embodiment, if the functional groups of the functionalized fluoro(co)polymer and functional polyolefin are not reactive with each other, a bridging compound having two functional groups (same or different) reactive with both polymers is also utilized in the reaction to form the compatibilizer.

Each linking compound before reaction with the fluoro(co)polymer or polyolefin has at least two reactive functional groups which, although they can be the same, are preferably different, with examples including, but not limited to, an unsaturated hydrocarbon group, an amino group, a hydroxyl group, a carboxylic acid group, an anhydride group, an epoxy group or an isocyanate group, or the like. For example, in one embodiment a linking compound having an unsaturated hydrocarbon group and a functional group such as an anhydride, e.g. maleic anhydride, is reacted with a fluoro(co)polymer to produce a functionalized fluoro(co)polymer. The unsaturated group is bonded to the main chain of the fluoro(co)polymer upon removal of a labile hydrogen, leaving an anhydride functional group which can be reacted with a functionalized polyolefin containing an epoxy group, isocyanate group, etc.

The linking compounds and bridging compounds are generally monomers, but in some instances is a polymer or copolymer. Suitable linking and/or bridging compounds include, but are not limited to, unsaturated carboxylic anhydrides, unsaturated amines, unsaturated carboxylic acids, epoxy group containing unsaturated compounds, and hydrolyzable silyl group containing unsaturated compounds, diamines, isocyanates, polyols, and dicarboxylic acids. Examples of unsaturated anhydrides include, but are not limited to, maleic anhydride, itaconic anhydride, citraconic anhydride, and bicyclo-2,2,1-hept-2-ene-5,6-dicarboxylic anhydride. Examples of suitable unsaturated carboxylic acids include, but are not limited to, acrylic acid, methacrylic acid, maleic acid, monomethyl maleate, fumaric acid, itaconic acid, citraconic acid, and crotonic acid. Examples of epoxy group-containing unsaturated compounds include, but are not limited to, glycidyl acrylate, glycidyl methacrylate and allyl glycidyl ether. Examples of hydrolyzable silyl group-containing unsaturated compounds include, but are not limited to, vinyl trimethoxysilane, vinyl triethoxysilane, vinyl triacetoxysilane, gamma-methacryloxypropyltrimethoxysilane or vinyl tris(β-methoxyethoxy)silane. Examples of amines include, but are not limited to, 3-amino cyclopentene, amino cyclohexanol, p-amino benzoic acid, ethylene diamine, propylene diamine, 1,4-butane diamine, and 1,5-pentane diamine. The isocyanates of the present invention generally have the formula $R(NCO)_n$, where n is an integer of about 2 to 4 and preferably 2. R can be aromatic, cycloaliphatic, aliphatic, or combinations thereof having from 2 to 20 carbon atoms. Examples of isocyanates include, but are not limited to, diphenylmethane4,4'-diisocyanate (MDI); toluene-2,4-diisocyanate (2,4-TDI); toluene-2,6-diisocyanate (2,6-TDI); methylene bis (4-cyclohexylisocyanate) ($H_{12}$ MDI); m-xylene diisocyanate (XDI) and 1,4-cyclohexyl diisocyanate (CHDI). Examples of dicarboxylic acids include, but are not limited to, oxalic acid, malonic acid, succinic acid, glutaric acid, adipic acid, and maleic acid. The polyols of the present invention are preferably diols having from 2 to about 20 carbon atoms and can be alkane diols, cycloaliphatic diols, alkylaryl diols, and the like. Examples of polyols include, but are not limited to, ethylene glycol, propylene glycol, 1,6 hexane diol, 1,3 butane diol, 1,5 pentane diol, neopentyl glycol and 2-cyclopentane diol, hydroquinone-di(β-hydroxyethyl)ether (HOEE). The polyols can also include ether linkages which include compounds such as diethylene glycol and dipropylene glycol.

C) Functionalized Olefin Component

As for the olefin derived component of the compatibilizer, generally any linear or branched functional group containing alpha monoolefin monomer, polymer, or copolymer derived from an olefin monomer, having from 2 to about 14 carbon atoms and preferably 2 to about 6 carbon atoms is utilized. Examples of monomers include, but not limited to, ethylene, propylene, butene, pentene, hexene, 2-methyl-1-propene, 3-methyl-1-pentene, 4-methyl-1-pentene, and 5-methyl-1-hexene. Examples of polyolefins include both homopolymers and copolymers, i.e., polyethylene, ethylene copolymers such as EPDM, polypropylene, propylene copolymers, and polymethylpentene polymers. An olefin copolymer can include a minor amount of non-olefinic monomers, such as vinyl acetate, a diene, or acrylic and non-acrylic monomer. Generally, a polyolefin copolymer includes less than about 20 weight percent of a non-olefinic monomer, desirably less than about 10 weight percent, and preferably less than about 5 weight percent of a non-olefinic monomer. In one embodiment, the olefin monomers are polymerized in the presence of a linking compound having a) a polymerizable functional group, such as an unsaturated portion and b) a second functional group such as an anhydride group, i.e., maleic anhydride or an epoxy group to produce a functionalized olefin derived component. Polyethylene and polypropylene (co)polymers bearing a functional group are preferred for use in forming the compatibilizer.

In one embodiment, the olefin component includes at least one epoxy functional group, an amine functional group, or an acid functional group, with epoxy or acid functional groups being preferred. Functional group containing polyolefins and methods for forming the same are well known to those of ordinary skill in the art. Functionalized polyolefins are available commercially from sources such as Uniroyal, Atofina, and DuPont. Epoxy modified polyethylenes are available from Atofina as Lotader®. Acid modified polyethylenes are available from DuPont as Fusabond®.

Formation of fluoro(co)polymers containing a functional group is, in one embodiment, as follows. The fluoro(co)polymer having a labile hydrogen attached to a main chain carbon atom is reacted with a linking compound having at least two functional groups, with one functional group being reactive with and able to replace the labile hydrogen of the fluoro(co)polymer. The reaction is performed in the presence of an effective amount of free radical catalyst as known to those of ordinary skill in the art, and include, but are not limited to, peroxides and azo compounds. Suitable peroxides comprise dibenzoyl peroxide, dicumyl peroxide, 1,3-bis(t-butylperoxy-isopropyl)benzene, di-t-butyl peroxide, dilauroyl peroxide, 2,5-dimethyl-2,5-bis(t-butyl-peroxy)hexane, 2,5-dimethyl-2,5-bis(t-butylperoxy)hexene-3 and di(t-butylperoxy)perbenzoate, or a combination thereof. Suitable azo compounds include, but are not limited to, 2,2'-azobis(isobutyronitrile)(AIBN), 2,2'-azobis(2-cyano-2-butane), dimethyl 2,2'-azobisdimethylisobutyrate, 4,4'-azobis(4-cyanopentanoic acid), 1,1'-azobis(cyclohexanecarbanitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxy-ethyl)]-propionamide, and 2,2'-azobis(N,N'-dimethylene-isobutyramidine)dihydro-chloride.

The reaction is carried out at a temperature above the melting point of the fluoro(co)polymer and is sufficient to cause grafting of the linking compound to the fluoro(co)polymer containing component, and generally ranges from about 100° C. to about 300° C., and preferably from about 150° C. to about 230° C, but always below the decomposition temperature of any of the reactants. The grafting is believed to be accomplished by the following reaction mechanism. First, a radical formed from the free radical catalyst will remove a labile hydrogen atom from the fluorine containing component to form a fluoro(co)polymer radical. Further, a radical formed from the free radical catalyst will remove a hydrogen atom from the linking compound to form a radical. Then, both radicals will associate to complete grafting thus forming the fluoro(co)polymer having at least one functional group derived from the linking compound. The amount of linking compound utilized ranges generally from about 0.05 to about 10 parts, desirably from about 0.10 to about 5 parts, and preferably from about 0.3 to about 3 parts per 100 parts by weight of the fluoro(co)polymer.

In one embodiment, the fluoro(co)polymer containing a functional group is reacted with the olefin component containing a functional group, with the functional groups of the polymers being reactive with each other, as follows. The grafted fluoro(co)polymer having a functional group is melt reacted, preferably in a mixing apparatus, with the functionalized polyolefin component at a temperature of about 100° C. to about 300° C. and preferably about 150° C. to about 230° C. in order to form the compatibilizer of the present invention. The functionalized portion of the polyolefin component reacts with the complementary functionality present on the fluoro(co)copolymer to form an olefin grafted fluoro(co)polymer. In a further embodiment, the fluoro(co)polymer and the functionalized olefin component have the same functional groups or are non-reactive with each other. Accordingly, the melt reaction disclosed hereinabove is performed utilizing a bridging compound having a functional group reactive with the fluoro(co)polymer as well as the functionalized polyolefin component. Thus, the compatibilizer includes a fluoro(co)polymer segment and a polyolefin segment bonded by the bridging compound.

Compatibilized Blends

The compatibilizer is subsequently blended with at least one fluoro(co)polymer and at least one polyolefin. The amount of compatibilizer generally ranges from about 1 to about 40 parts, desirably from 3 to about 20 parts, and preferably from about 5 to about 18 parts by weight based on 100 parts by weight of fluoro(co)polymer and polyolefin utilized in the blend.

Polyolefins

Polyolefins suitable for blending with the compatibilizer and fluoro(co)polymer comprise amorphous or crystalline a) homopolymers or b) copolymers of two or more different monomers derived from alpha monoolefins having from 2 to about 14 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and mixtures thereof. Polyolefins include, but are not limited to, low density polyethylene, high density polyethylene, linear low density polyethylene, polypropylene (isotactic and syndiotactic), an ethylene/propylene copolymer, polybutene. Copolymers include the greater part by weight of one or more olefin monomers and a lesser amount of one or more monomers such as vinyl monomers including vinyl acetate, or a diene monomer, EPDM, etc. Functionalized polyolefins can also be blended with the compatibilizer. Of the olefinic polymers, polyethylene such as high-density polyethylene, and polypropylene are preferred because of molding processibility, resistance to chemicals, cost, etc. Thermoplastic crystalline olefin polymers are preferred in one embodiment. Polyolefin polymers and copolymers are commercially available from commercial sources including, but not limited to, Chevron, Dow Chemical, DuPont, Exxon Mobil, Huntsman Polymers, Ticona, and Westlake Polymer under various designations.

Fluoro(co)polymers

Fluoro(co)polymers utilizable in the blends of the present invention refer to any polymer containing fluorine and refers to homopolymers and/or copolymers, with copolymers referring to the use of two or more different monomers used in the preparation thereof wherein at least one of the monomers contains a fluorine atom. Fluorocarbon polymers are typically characterized by having a backbone of carbon atoms with fluorine atoms attached pendant thereto, either directly or indirectly. Fluoro(co)polymers are derived in part from monomers including, but not limited to, tetrafluoroethylene, chlorotrifluoroethylene, vinylidene fluoride, vinyl fluoride, hexafluoropropylene, perfluoromethylvinyl ether, perfluoromethylvinyl ether, perfluoro-propylvinyl ether. Examples of suitable polymers and copolymers include, but are not limited to, ethylene-tetrafluoroethylene copolymer; ethylene chlorotrifluoroethylene copolymer; propylene-tetrafluoroethylene copolymer; polyvinyl fluoride; polyvinylidene fluoride; fluorinated ethylene-propylene copolymer; a terpolymer of tetrafluoroethylene or propylene, hexafluoropropylene and vinylidene fluoride; and a terpolymer of tetrafluoroethylene, ethylene and hexafluoropropylene. Polyvinyl fluoride; polyvinylidene fluoride; a terpolymer of tetrafluoroethylene or propylene, hexafluoropropylene and vinylidene fluoride; and a terpolymer of tetrafluoroethylene, ethylene and hexafluoropropylene are preferred.

The amount of fluoro(co)polymer(s) range generally from about 10 to about 90, desirably from about 20 to about 80, and preferably from about 30 to about 70 parts per 100 parts by weight of the fluoro(co)polymer(s) and polyolefin(s) utilized in the blends of the present invention.

In addition to the above-identified components, compositions of the invention optionally include various additives, fillers, lubricants, stabilizers, accelerators, processing aids, flame retardants, dispersing aids, colorants, and the like, which are utilized in conventional amounts. Non-limiting examples of fillers include both organic and inorganic fillers such as silica, organically modified silica, talc, clay, and fibers such as wood fibers, carbon fibers, glass fibers or composite fibers. Non-limiting examples of pigments or colorants include carbon black and titanium dioxide.

Suitable flame retardants include, but are not limited to, aluminum trihydrate, magnesium hydroxide, phosphorous compounds, nitrogen compounds, zinc borates, halogenated compounds, and the like and are available from Alcoa, Huber, Martin Marietta, Microfine Materials and others.

In a preferred embodiment, the compatibilizer, fluoro(co)polymer(s) and polyolefin(s) are melt mixed at a temperature generally above the highest melting point of the noted components, but below the decomposition temperature of any of the same. Preferred fluoropolymers have a melting point less than or equal to 250° C. or 300° C. Of course, any additional fillers, additives, or the like are also optionally present during melt blending. Mastication should be sufficient to obtain homogeneous blends, with mixing times of about 1 to about 30 minutes being satisfactory. The compositions are melt processed utilizing standard equipment known in the art such as roll mills, Banbury mixers such as Brabender mixers, and extruders, with twin screw extruders being preferred.

After the compatibilizer, fluoro(co)polymer, polyolefin, and any additional components such as flame retardants and smoke suppressants have been mixed or blended, and preferably melt mixed, the blend is then processed into a desired form utilizing equipment known in the art to form particles such as pellets, chips, flakes, spheres or the like, or suitable articles, such as insulation, jackets, conduits, and sheeting.

The blends of the present invention comprising a compatibilizer, fluoropolymer and polyolefin exhibit surprisingly good mechanical properties such as tensile strength and elongation. Furthermore, the blends have desirable dielectric properties and are useful as insulating materials for wire and cable.

The present invention will be better understood by reference to the following examples which serve to describe, but not to limit, the present invention.

EXAMPLES

Example 1

Preparation of Compatibilizer

A functional group containing fluoro(co)polymer was formed by melt mixing 0.4 parts of maleic anhydride (linking compound), 2 parts of vulcup KE peroxide di(t-butylperoxy) di-isopropyl benzene) per 100 parts of an ethylene-chlorotrifluoroethylene copolymer (ECTFE), Halar 434, available from Solvay Polymers at about 200° C. in a Brabender mixer at 60 RPM for a period of about 3 minutes to form the functionalized fluoro(co)polymer utilized in compatibilizers 1, 2 and 3. The functionalized fluoro(co)polymer of compatibilizer 4 was prepared by melt mixing 0.5 parts of maleic anhydride, and 2 parts of vulcup KE peroxide per 100 parts of an ethylene chlorotrifluoroethylene copolymer (ECTFE) Halar 353 from Solvay Polymers at about 200° C. in a Brabender mixer at 60 RPM for a period of about 3 minutes. Afterwards, the maleic anhydride modified fluoro(co)polymers were melt mixed at 200° C. in a Banbury with each of the functional group containing polyolefins listed in Table 1 in the stated weight ratios for a period of 5 minutes to form the indicated compatibilizer.

TABLE I

|  | Compatibilizer 1 | Compatibilizer 2 | Compatibilizer 3 | Compatibilizer 4 |
|---|---|---|---|---|
| Maleic anhydride modified ECTFE | 30 | 50 | 40 | 50 |
| Epoxy modified polyethylene (Lotader AX8840 - Atofina) | 70 | 25 | 60 | 25 |
| Acid modified polyethylene (Fusabond EMB 100 D - DuPont) | 0 | 25 | 0 | 25 |
| Weight Percent | 100 | 100 | 100 | 100 |

Example 2

As illustrated in Table II, fluoro(co)polymer and polyolefin blends including the compatibilizer of the present invention exhibit greater tensile strength at break when compared to similar control formulations without a compatibilizer. The controls and examples were formed by melt mixing the stated components and temperatures of about 200° C. for about 5 minutes in a Banbury. Afterwards, test samples were prepared from compression molded plaques. The compression molding was carried out at 220° C. for 5 minutes.

ylene blends were tested. The compatibilized blend and the fire retardants additives were melt-blended at 200° C. using a Banbury for 3 minutes, and then compression molded at 200° C. for 3 minutes. As illustrated in Table III, a control formulation without flame retardant compounds was tested against various compositions having various amounts of flame retardants present therein. All blends were compatibilized with compatibilizer 4 disclosed hereinabove. The results show that

TABLE II

EFFECT OF COMPATIBILIZERS ON PROPERTIES OF FLUORO(CO)POLYMER/POLYOLEFIN BLENDS

| Compound # | Control 1 | 1 | Control 2 | 2 | Control 3 | 3 |
|---|---|---|---|---|---|---|
| Polyethylene (EXACT 8201 Exxon) | 70 | 63 | 50 | 40 | 40 | 36 |
| ECTFE (HALAR 434) | 30 | 27 | 50 | 40 | 60 | 54 |
| COMPATIBILIZER   1 | 0 | 0 | 0 | 0 | 0 | 0 |
| 2 | 0 | 0 | 0 | 20 | 0 | 0 |
| 3 | 0 | 0 | 0 | 0 | 0 | 10 |
| Total Weight (%) | 100 | 100 | 100 | 100 | 100 | 100 |
| Specific Gravity, ASTM D 792 | 1.04 | 1.03 | 1.15 | 1.17 | 1.22 | 1.23 |
| Hardness, Shore D (Inst/10 ssec), ASTM D2240 | 37/34 | 38/35 | 47/42 | 51/47 | 55/48 | 56/50 |
| Tensile Strength @ Break, Psi, ASTM D412 | 2560 | 3110 | 1600 | 2110 | 1020 | 2390 |
| Elongation @ Break, %, ASTM D412 | 660 | 640 | 610 | 360 | 100 | 270 |
| MI @190° C. (10 kg), g/10 min, ASTM D1238 | 10.5 | 7.9 | 11.5 | 5.06 | 12.4 | 5.1 |
| Dielectric Constant @ 1 KHz, ASTM D150 | 2.23 | 2.27 | 2.33 | 2.33 | 2.37 | 2.39 |
| Dissipation Factor @ 1 KHz, ASTM D150 | 0.0011 | 0.00148 | 0.00166 | 0.00192 | 0.00228 | 0.00217 |

Example 3

The effect of various flame retardant compounds on the properties of compatibilized fluoro(co)polymer and polyeththe compatibilized blends including flame retardant compounds have much lower peak HRR and average HRR values and lower smoke.

TABLE III

EFFECT OF FLAME RETARDANT COMPOUNDS ON PROPERTIES OF ECTFE/POLYETHYLENE BLENDS

| Raw Material | Control | 1 | 2 | 3 | 4 |
|---|---|---|---|---|---|
| Polyethylene (EXACT 8201 Exxon) | 45 | 45 | 45 | 45 | 45 |
| ECTFE (HALAR 353) | 45 | 45 | 45 | 45 | 45 |
| Compatibilizer 4 | 10 | 10 | 10 | 10 | 10 |
| CP FLAM (VAMP) | 0 | 3 | 9 | 18 | 9 |
| Ammonium Polyphosphate (PHOSCHECK P-30) (Solutia) | 0 | 2 | 6 | 12 | 6 |
| CYGUARD 1204 (Cytec) | 0 | 2 | 6 | 12 | 6 |
| CYAGARD RF-67 (Cytec) | 0 | 3 | 9 | 18 | 9 |
| Zinc Borate (ZB-467) (Borax) | 0 | 0 | 0 | 0 | 10 |
| Zinc Stannate (CHARMAX ZST) (Polymer Additives) | 0 | 0 | 0 | 0 | 5 |
| ZINC OXIDE - FR PROCESS | 0.5 | 0.5 | 0.5 | 0.5 | 0.5 |
| STEARIC ACID GP GRADE | 0.2 | 0.2 | 0.2 | 0.2 | 0.2 |
| CALCIUM STEARATE | 0.2 | 0.2 | 0.2 | 0.2 | 0.2 |
| Heat Stabilizer (IRGANOX 1010) (Ciba Giegy) | 0.5 | 0.5 | 0.5 | 0.5 | 0.5 |
| Metal Deactivator (IRGONOX 1024 MD) (Ciba Giegy) | 0.2 | 0.2 | 0.2 | 0.2 | 0.2 |
| Heat Stabilizer (IRGANOX 1098), (Ciba Giegy) | 0.5 | 0.5 | 0.5 | 0.5 | 0.5 |
| Total (%) | 102.1 | 112.1 | 132.1 | 162.1 | 147.1 |
| Specific Gravity, ASTM D 792 | 1.16 | 1.18 | 1.18 | 1.24 | 1.29 |
| Hardness, Shore D(Inst/10 Sec.), ASTM D2240 | 50/45 | 50/46 | 49/45 | 58/53 | 58/53 |
| MI, g/10 min (190° C./10 kg), ASTM D1238 | 6.04/26.3 | 20.8/122 | 16.2/73.3 | 29.8/113 | 7.51/93.2 |
| Dielectric constant @ 1 KHZ, ASTM D150 | 2.29 | 2.58 | 2.57 | 3.16 | 2.97 |
| Dissipation Factor @ 1 KHZ, ASTM D150 | 0.00141 | 0.00715 | 0.00757 | 0.0369 | 0.0256 |
| Peak HRR @ 50 Kw/sqm, Kw/sqm, ASTM E1354 | 740 | 512 | 342 | 311 | 151 |
| Avg. HRR @ 50 Kw/sqm, Kw/sqm, ASTM E1354 | 291 | 201 | 151 | 173 | 87 |

TABLE III-continued

EFFECT OF FLAME RETARDANT COMPOUNDS ON PROPERTIES OF ECTFE/POLYETHYLENE BLENDS

| Raw Material | Control | 1 | 2 | 3 | 4 |
|---|---|---|---|---|---|
| Total HR @ 50 Kw/sqm, MJ/sqm, ASTM E1354 | 173 | 152 | 146 | 134 | 154 |
| AVG. Effective Heat of Cumbustion, MJ/kg, ASTM E1354 | 25.2 | 20.9 | 19.3 | 18.7 | 23.9 |
| Sp. Ext. Area, @ 50 Kw/sqm, sqm/Kg, ASTM E1354 | 1023 | 1064 | 857 | 781 | 699 |
| Peak Smoke @ 50 Kw/sqm, 1/m, ASTM E1354 | 9 | 7.5 | 7 | 5 | 3 |
| Time to sustained Ignition, Sec, ASTM E1354 | 45 | 29 | 33 | 27 | 30 |

Example 4

Table IV below illustrates various properties obtained when utilizing compatibilized blends of polypropylene (functional group containing polyolefins and regular polyolefins) and ECTFE blends. Composition 3 in Table IV includes flame retardant compounds wherein the blends have excellent values with respect to peak smoke, peak HRR and average HRR. The compositions were each melt blended at 200° C. using a Banbury for 3 minutes and then compression molded at 200° C. for 3 minutes.

TABLE IV

COMPATABILIZED BLENDS OF POLYPROPYLENE AND ECTFE

| Raw Material | Control | 1 | 2 | 3 |
|---|---|---|---|---|
| Maleated Polypropylene (UNITE MP 880) | 0 | 0 | 5 | 5 |
| Polypropylene (FORTILENE 9000 (0.8MI)) | 40 | 23 | 18 | 18 |
| Epoxy Modified Polyethylene (LOTADER AX 8840) | 0 | 5 | 5 | 5 |
| ECTFE (HALAR 353) | 45 | 45 | 45 | 45 |
| Compatibilizer 4 | 15 | 15 | 15 | 15 |
| EPDM (ROYALTUFF 498), (maleated EPDM) | 0 | 12 | 0 | 0 |
| EPDM (ROYALTUFF 485), (maleated EPDM) | 0 | 0 | 12 | 12 |
| Zinc Borate (ZB-467) | 0 | 0 | 0 | 15 |
| Zinc Stannate (CHARMAX ZST) | 0 | 0 | 0 | 10 |
| ZINC OXIDE - FR PROCESS | 0.5 | 0.5 | 0.5 | 0.5 |
| STEARIC ACID GP GRADE | 0.2 | 0.2 | 0.2 | 0.2 |
| CALCIUM STEARATE | 0.2 | 0.2 | 0.2 | 0.2 |
| Heat Stabilizer (IRGANOX 1010) (Ciba Giegy) | 0.5 | 0.5 | 0.5 | 0.5 |
| Metal Deactivator (IRGONOX 1024 MD) (Ciba Giegy) | 0.2 | 0.2 | 0.2 | 0.2 |
| Heat Stabilizer (IRGANOX 1098) (Ciba Giegy) | 0.5 | 0.5 | 0.5 | 0.5 |
| Total (%) | 102.1 | 102.1 | 102.1 | 127.1 |
| Specific Gravity | 1.14 | 1.17 | 1.16 | 1.35 |
| Hardness, Shore D(Inst/10 Sec.) | 75/71 | 67/62 | 67/62 | 69/65 |
| Tensile Strength, Psi | 2780 | 3190 | 3780 | 2560 |
| Elongation @ Break, % | 230 | 330 | 370 | 160/210 |
| MI, g/10 min (190° C./10 kg) | 1.53/12.2 | 0.89/5.56 | 0.40/3.33 | 2.49/18.3 |
| Dielectric constant @ 1 KHZ | 2.36 | 2.37 | 2.35 | 2.62 |
| Dissipation Factor @ 1 KHZ | 0.00135 | 0.002291 | 0.002347 | 0.005499 |
| Peak HRR @ 50 Kw/sqm, Kw/sqm | 501 | 739 | 687 | 207 |
| Avg. HRR @ 50 Kw/sqm, Kw/sqm | 233 | 248 | 226 | 148 |
| Total HR @50 Kw/sqm, MJ/sqm | 197 | 187 | 190 | 135 |
| AVG. Effective Heat of Cumbustion, MJ/kg | 25.6 | 24.6 | 25.1 | 20.1 |
| Sp. Ext. Area, @ 50 Kw/sqm, sqm/Kg | 894 | 892 | 899 | 785 |
| Peak Smoke @ 50 Kw/sqm, 1/m | 7 | 9 | 9 | 3.5 |
| Time to sustained Ignition, Sec | 52 | 82 | 73 | 82 |

Example 5

HTE/Polyethylene Compatabilizer

A terpolymer of hexafluoropropylene, tetrafluoroethylene, and ethylene (HTE) available from Dyneon as HTE E14660 was melt mixed in a Brabender with maleic anhydride linking compound at 200° C. for 10 minutes. One part of maleic anhydride and one part of Luperox 130 (available from Elf Atochem) peroxide were utilized per 100 parts by weight of HTE. The maleic anhydride grafted HTE (functional group container fluoro(co)polymer) was then melt reacted with an epoxy functional polyolefin (Lotader AX 8900 from Atofina) at about 200° C. for about 10 minutes in a Brabender to form a polyethylene/HTE compatibilizer.

Example 6

In order to illustrate the effectiveness of compatibilizers of the present invention, Table V below illustrates the properties of a control formulation and various blends utilizing the compatibilizer prepared above in Example 5. The blends in the table were melt mixed at about 200° C. for 10 minutes utilizing a Brabender internal mixer at 60 RPM. The tested specimens were compression molded at 200° C. for 10 minutes. As evident from the table, the polyethylene/HTE compatibilizer has increased tensile strength at break as well as elongation at break when compared to a control formulation without compatibilizer.

TABLE V

|  | Control | 1 | 2 | 3 |
|---|---|---|---|---|
| HDPE (parts) | 50 | 50 | 50 | 50 |
| HTE (parts) | 50 | 50 | 50 | 50 |
| Compatibilizer (parts) | 0 | 10 | 20 | 30 |
| Tensile strength, psi ASTM D412 | 3200 | 3950 | 3950 | 3950 |
| % Elongation ASTM D412 | 13 | 520 | 450 | 400 |

HDPE: HM AO 34B available from Exxon Mobil

In accordance with the patent statutes, the best mode and preferred embodiment have been set forth. The scope of the invention is not limited thereto, but rather by the scope of the attached claims.

What is claimed is:

1. A compatibilized composition, comprising:
a blend comprising a fluoro(co)polymer; a polyolefin polymer or copolymer, wherein the polyolefin copolymer is a copolymer of two or more different olefin monomers having from 2 to about 14 carbon atoms, or a greater part by weight of one or more olefin monomers and a lesser amount of one or more monomers of a vinyl acetate monomer and a diene monomer; and a compatibilizer, said compatibilizer comprising the reaction product of:
 a) a fluoro(co)polymer having a functional group and a polyolefin polymer or copolymer having a functional group, said functional groups being complementary and reactive with each other; or
 b) a fluoro(co)polymer having a functional group, a polyolefin polymer or copolymer having a functional group, said functional groups being the same or non-reactive with each other, and a bridging compound having at least two functional groups with said bridging compound first functional group reactive with said fluoro(co)polymer functional group and said bridging compound second functional group reactive with said polyolefin polymer or copolymer functional group, and wherein the compatibilizer polyolefin copolymer is derived from two or more different olefin monomers having from 2 to about 14 carbon atoms or an olefin monomer having from 2 to about 14 carbon atoms and one or more of a vinyl acetate monomer, a diene monomer, and an acrylic monomer.

2. The composition according to claim 1, wherein said fluoro(co)polymer having a functional group comprises the reaction product of a fluoro(co)polymer having at least one labile hydrogen atom bonded to a main chain carbon atom and a linking compound having at least two functional groups, with said linking compound first functional group reactive with the fluoro(co)polymer.

3. The composition according to claim 2, wherein the linking compound, bridging compound, or a combination thereof is an unsaturated carboxylic anhydride, an unsaturated carboxylic acid, an unsaturated amine, an epoxy group containing unsaturated compound, a hydrolyzable silyl group containing unsaturated compound, a diamine, an isocyanate, a polyol, or a dicarboxylic acid.

4. The composition according to claim 3, wherein said linking compound or bridging compound or a combination thereof is maleic anhydride, itaconic anhydride, citraconic anhydride, bicyclo-2,2,1-hept-2-ene-5,6-dicarboxylic anhydride, acrylic acid, methacrylic acid, maleic acid, monomethyl maleate, fumaric acid, itaconic acid, citraconic acid, crotonic acid, glycidyl acrylate, glycidyl methacrylate, allyl glycidyl ether, vinyl trimethoxysilane, vinyl triethoxysilane, vinyl triacetoxysilane, gamma methacryloxypropyltrimethoxysilane vinyl tris(β-methoxyethoxy)silane, 3-amino cyclopentene, amino cyclohexanol, p-amino benzoic acid, ethylene diamine, propylene diamine, 1,4-butane diamine, 1,5-pentane diamine, oxalic acid, malonic acid, succinic acid, glutaric acid, adipic acid, an isocyanate having the formula $R(NCO)_n$, wherein n is an integer from about 2 to 4 and R is 2 to 20 carbon atoms, or a diol having from 2 to about 20 carbon atoms optionally having ether linkages.

5. The composition according to claim 4, wherein said compatibilizer fluoro(co)polymer is derived from at least one of vinylidene fluoride; vinyl fluoride; (perfluorobutyl)ethylene; (fluoroalkyl)vinyl ether; or tetrafluoroethylene or perfluoro(alkyl vinyl ether) and at least one monomer comprising ethylene or propylene.

6. The composition according to claim 5, wherein the fluoro(co)polymer is polyvinyl fluoride; polyvinylidene fluoride; ethylene chlorotri-fluoroethylene copolymer; a fluorinated ethylene propylene copolymer, a terpolymer of tetrafluoroethylene or propylene, hexafluoropropylene and vinylidene fluoride; a terpolymer of tetrafluoroethylene, ethylene and hexafluoropropylene; or combinations thereof, and wherein the polyolefin is polyethylene, polypropylene, polymethylpentene, a propylene copolymer, an ethylene copolymer, or a combination thereof.

7. The composition according to claim 6, wherein said linking compound is maleic acid or maleic anhydride, and wherein the linking compound is present in an amount from about 0.05 to about 10 parts per 100 parts by weight of the compatibilizer fluoro(co)polymer.

8. The composition according to claim 2, wherein said compatibilizer fluoro(co)polymer is derived from at least one of vinylidene fluoride; vinyl fluoride; (perfluorobutyl)ethylene; (fluoroalkyl)vinyl ether; tetrafluoroethylene or perfluoro (alkyl vinyl ether) and at least one monomer comprising ethylene or propylene; or a fluorinated olefin, wherein the compatibilizer is present in an amount from about 1 about 40 parts by weight per 100 parts by weight of the fluoro(co) polymer and polyolefin polymer or copolymer, and wherein the fluoro(co)polymer is present in an amount from about 20 to about 80 parts by weight of the fluoro(co)polymer and polyolefin polymer or copolymer.

9. The composition according to claim 8, wherein said compatibilizer fluoro(co)polymer is ethylene-tetrafluoroethylene copolymer, ethylene chloro-trifluoroethylene copolymer, propylene-tetrafluoroethylene copolymer, polyvinyl fluoride, polyvinylidene fluoride; a terpolymer of tetrafluoroethylene or propylene, hexa-fluoropropylene and vinylidene fluoride; or a terpolymer of tetrafluoroethylene, ethylene and hexafluoropropylene, or a combination thereof.

10. The composition according to claim 9, wherein said linking compound or bridging compound or a combination thereof is maleic anhydride, itaconic anhydride, citraconic anhydride, bicyclo-2,2,1-hept-2-ene-5,6- dicarboxylic anhydride, acrylic acid, methacrylic acid, maleic acid, monomethyl maleate, fumaric acid, itaconic acid, citraconic acid, crotonic acid, glycidyl acrylate, glycidyl methacrylate, allyl glycidyl ether, vinyl trimethoxysilane, vinyl triethoxysilane, vinyl triacetoxysilane, gamma methacryloxypropyltrimethoxysilane vinyl tris(β-methoxyethoxy)silane, 3-amino cyclopentene, amino cyclohexanol, p-amino benzoic acid, ethylene diamine, propylene diamine, 1,4-butane diamine, 1,5-pentane diamine, oxalic acid, malonic acid, succinic acid, glutaric acid, adipic acid, an isocyanate having the formula $R(NCO)_n$, wherein n is an integer from about 2 to 4 and R is 2 to 20 carbon atoms, or a diol having from 2 to about 20 carbon atoms optionally having ether linkages.

11. The composition according to claim 1, wherein at least one flame retardant compound is present in the blend.

12. The composition according to claim 5, wherein at least one flame retardant compound is present in the blend, wherein the compatibilizer is present in an amount from about 1 to about 40 parts by weight per 100 parts by weight of the fluoro(co)polymer and polyolefin polymer or copolymer, and wherein the fluoro(co)polymer is present in an amount from about 20 to about 80 parts by weight of the fluoro(co)polymer and polyolefin polymer or copolymer.

13. The composition according to claim 10, wherein at least one flame retardant compound is present in the blend.

14. The composition according to claim 11, wherein said flame retardant is aluminum trihydrate, magnesium hydroxide, zinc borate, zinc stannate, or ammonium polyphosphate or a combination thereof.

15. The composition according to claim 13, wherein said flame retardant is aluminum trihydrate, magnesium hydroxide, zinc borate, zinc stannate, or ammonium polyphosphate or a combination thereof.

16. A compatibilized composition, comprising:
a blend comprising a fluoro(co)polymer; a polyolefin polymer or copolymer, wherein the polyolefin copolymer is a copolymer of two or more different olefin monomers having from 2 to about 14 carbon atoms, or a greater part by weight of one or more olefin monomers and a lesser amount of one or more monomers of a vinyl acetate monomer and a diene monomer; and a compatibilizer, said compatibilizer comprising the reaction product of:
a) a fluoro(co)polymer having a first functional group, wherein the first functional group is an unsaturated hydrocarbon group, an amino group, a hydroxyl group, a carboxylic acid group, an anhydride group, an epoxy group or an isocyanate group; and
b) a polyolefin polymer or copolymer having a second functional group, wherein the second functional group is an unsaturated hydrocarbon group, an amino group, a hydroxyl group, a carboxylic acid group, an anhydride group, an epoxy group or an isocyanate group, wherein the first functional group is different from and reactive with the second functional group;
wherein the compatibilizer is present in an amount from about 1 to about 40 parts based on 100 parts by weight of the fluoro(co)polymer and polyolefin polymer or copolymer, and wherein the fluoro(co)polymer is present in an amount from about 10 to about 90 parts per 100 parts by weight of the fluoro(co)polymer and polyolefin polymer or copolymer, and wherein the copolymer of the polyolefin copolymer having the second functional group is derived from two or more different olefin monomers having from 2 to about 14 carbon atoms or an olefin monomer having from 2 to about 14 carbon atoms and one or more of a vinyl acetate monomer, a diene monomer, and an acrylic monomer.

17. The compatibilized composition according to claim 16, wherein said fluoro(co)polymer is derived from at least one of vinylidene fluoride; vinyl fluoride; (perfluorobutyl)ethylene; (fluoroalkyl)vinyl ether; or tetrafluoroethylene or perfluoro (alkyl vinyl ether) and at least one monomer comprising ethylene or propylene.

18. The compatibilized composition according to claim 17, wherein the fluoro(co)polymer is polyvinyl fluoride; polyvinylidene fluoride; ethylene chlorotrifluoroethylene copolymer; a terpolymer of tetrafluoroethylene or propylene, hexafluoropropylene and vinylidene fluoride; a terpolymer of tetrafluoroethylene, ethylene and hexafluoropropylene; or combinations thereof, and wherein the polyolefin polymer or copolymer is polyethylene, polypropylene, polymethylpentene, a propylene copolymer, or an ethylene copolymer, or a combination thereof.

19. The compatibilized composition according to claim 18, wherein the polyolefin polymer or copolymer having the second functional group is epoxy modified polyethylene or acid modified polyethylene or combinations thereof, and wherein the fluoro(co)polymer having the first functional group is derived from maleic an hydride grafted to ethylene-chlorotrifluoroethylene.

20. The compatibilized composition according to claim 16, wherein the compatibilizer is present in an amount from 3 to about 20 parts based on 100 parts by weight of the fluoro(co)polymer and polyolefin polymer or copolymer, and wherein the fluoro(co)polymer is present in an amount from about 20 to about 80 parts per 100 parts by weight of the fluoro(co)polymer and polyolefin polymer or copolymer.

21. The compatibilized composition according to claim 17, wherein the compatibilizer is present in an amount from 5 to about 18 parts based on 100 parts by weight of the fluoro(co)polymer and polyolefin polymer or copolymer, and wherein the fluoro(co)polymer is present in an amount from about 30 to about 70 parts per 100 parts by weight of the fluoro(co)polymer and polyolefin polymer or copolymer.

22. The compatibilized composition according to claim 16, wherein at least one flame retardant compound is present in the blend.

23. The compatibilized composition according to claim 18, wherein at least one flame retardant compound is present in the blend.

24. The compatibilized composition according to claim 23, wherein the composition further includes an inorganic filler.

25. The compatibilized composition according to claim 24, wherein the inorganic filler is one or more of zinc borate, zinc stannate and zinc oxide.

26. The compatibilized composition according to claim 1, wherein the composition includes an inorganic filler.

27. The compatibilized composition according to claim 26, wherein the inorganic filler includes one or more of zinc borate, zinc stannate and zinc oxide.

* * * * *